United States Patent [19]

Wisnouskas et al.

[11] 4,380,531

[45] Apr. 19, 1983

[54] PROCESS FOR PREPARING PHOSPHORUS ACID FROM INDUSTRIAL WASTE MATERIALS

[75] Inventors: Joseph S. Wisnouskas, Grand Island, N.Y.; Roland Ho, Wayne, Pa.

[73] Assignee: Occidental Chemical Corporation, Niagara Falls, N.Y.

[21] Appl. No.: 313,416

[22] Filed: Oct. 21, 1981

[51] Int. Cl.³ .............................................. C01B 25/16
[52] U.S. Cl. .................................... 423/316; 423/304; 423/307
[58] Field of Search ....................... 423/307, 316, 304

[56] References Cited

U.S. PATENT DOCUMENTS

| | | | |
|---|---|---|---|
| 1,597,984 | 8/1926 | La Bour | 423/321 |
| 2,976,117 | 3/1961 | Pahud | 423/307 |
| 3,052,519 | 9/1962 | Bianchi et al. | 423/307 |
| 4,330,515 | 5/1982 | Campbell et al. | 423/316 |

Primary Examiner—O. R. Vertiz
Assistant Examiner—Gregory A. Heller
Attorney, Agent, or Firm—James F. Tao; William G. Gosz

[57] ABSTRACT

An improved process is provided for preparing highly purified phosphorus acid from industrial waste materials which are produced as by-products from the manufacture of sodium hypophosphite. Such industrial waste materials contain substantial quantities of calcium phosphite, and appreciable quantities of various metals such as iron, magnesium, aluminum and arsenic. The process of the present invention comprises, in a preferred embodiment thereof, reacting a slurry of said waste materials with sodium carbonate to produce calcium carbonate as a precipitate and a solution of sodium phosphite. The sodium phosphite solution is then passed through a cation ion exchange resin in the hydrogen form to produce a highly purified phosphorus acid product having significantly reduced quantities of metallic impurities.

21 Claims, 1 Drawing Figure

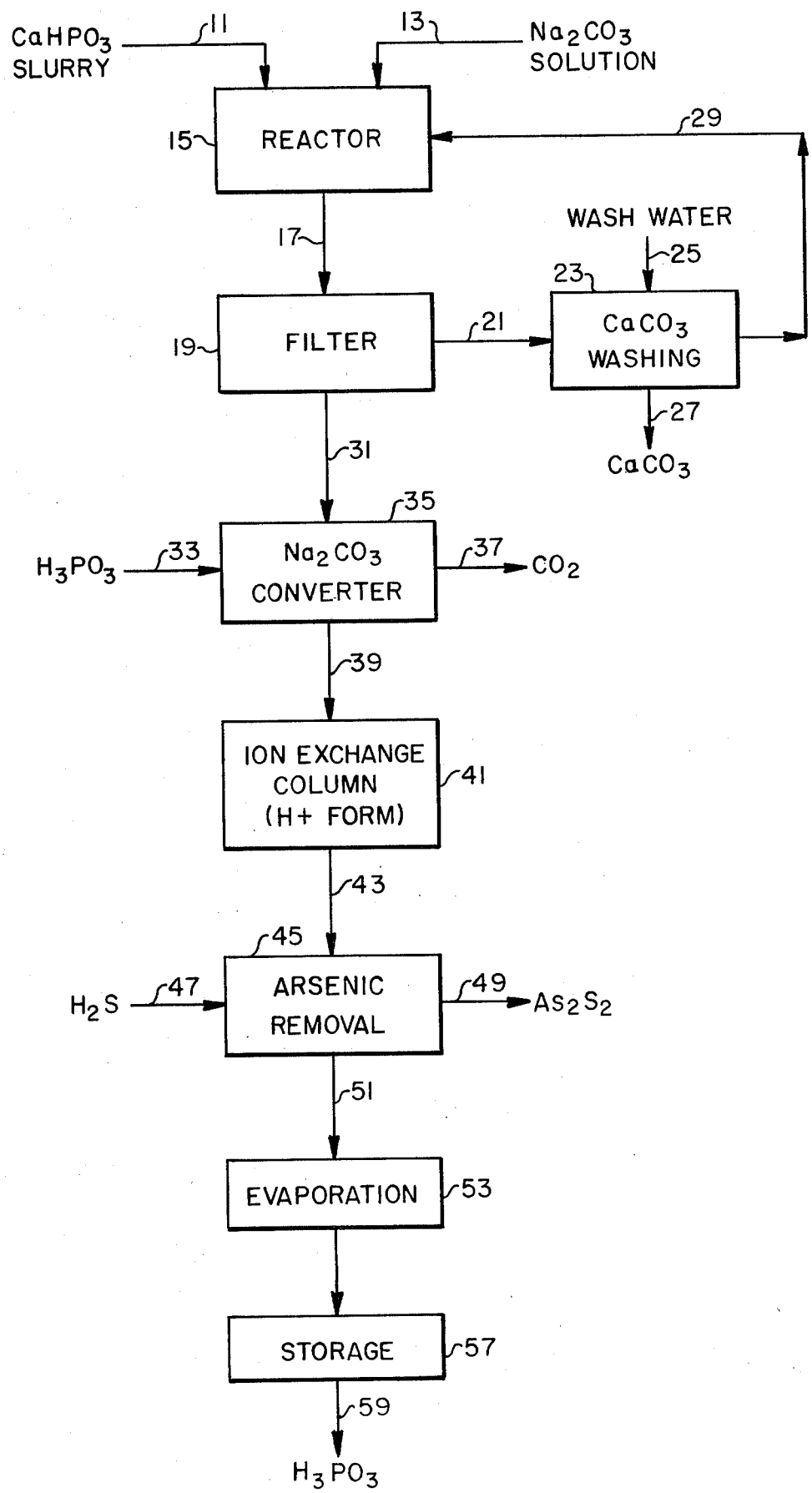

PROCESS FOR PREPARING PHOSPHORUS ACID FROM INDUSTRIAL WASTE MATERIALS

BACKGROUND OF THE INVENTION

The growth of the electroless plating industry in recent years, and especially its application in the automotive sector, has led to increased consumption of sodium hypophosphite. This in turn has led to rapid increases in the production of sodium hypophosphite, and to corresponding increases in the amount of by-products generated during the sodium hypophosphite manufacturing process.

One method of manufacturing sodium hypophosphite is through the reaction of caustic, i.e. sodium hydroxide, and phosphorus followed by lime precipitation of the crude calcium phosphite by-product. The precipitate of waste product formed during this manufacturing process is removed from the reactor and is usually discarded by burial in a secure landfill. This precipitate is generally in the form of a semi-solid mass or slurry, and is commonly referred to the trade as "hypo mud".

In the manufacture of sodium hypophosphite by reacting sodium hydroxide with phosphorus, followed by a lime treatment, the desired product and the precipitate contain many types of impurities depending upon the purity of the reactants used. The precipitate that is usually discarded contains quantities of lime, calcium phosphite, alumina, sand, and iron, to mention but a few. From an industrial standpoint, the technical difficulties encountered in reclamation of this type of waste material and the economics of such reclamation do not encourage further reprocessing.

With the advent of environmental rules and regulations concerning waste disposal, however, the disposal of hypo mud by landfill burial has become an environmental problem that the chemical industry must solve. This has led to the investigation of the economic utility of hypo mud to determine if commercial grade chemicals or by-products could be obtained therefrom.

Commonly assigned copending application Ser. No. 217,631, filed Dec. 18, 1980, discloses a process for preparing phosphorus acid ($H_3PO_3$) from a solution containing calcium phosphite by passing the solution through a cation ion exchange resin. However, there is no disclosure or indication in this application that the phosphorus acid produced by this method contains reduced quantities of metallic impurities, or that these impurities are not in fact "carried through" in the phosphorus acid conversion process.

U.S. Pat. No. 3,374,055, issued Mar. 19, 1968, discloses a process for converting tri-calcium phosphate to phosphoric acid ($H_3PO_4$) by treating the tri-calcium phosphate with phosphoric acid to form a mono-calcium phosphate solution, and passing this solution through a cation ion exchange resin in the hydrogen form to recover phosphoric acid. The reference suggests that the phosphoric acid obtained following this procedure contains reduced levels of impurities compared to phosphoric acid produced by the wet process. However, as described in more detail below, similar attempts at purifying phosphorus acid using ion-exchange resins having not proven entirely effective since this technique fails to remove appreciable amounts of iron and aluminum from the impure phosphorous acid.

It is thus a primary object of the present invention to provide an improved process for obtaining highly purified, i.e. commercial grade, phosphorus acid from hypo mud and related industrial waste materials.

SUMMARY OF THE INVENTION

The present invention is directed to a process for producing a commercial grade of phosphorus acid having a low level of metallic contaminants from impure industrial waste materials. The process comprises reacting a slurry of the calcium phosphite-containing waste materials with a salt or hydroxide of sodium or potassium to precipitate calcium ions and form a purified solution comprising a phosphite of sodium or potassium. Exemplary of the salts or hydroxides which are useful include sodium or potassium laurate, stearate, oxalate, carbonate, bicarbonate, hydroxide, and mixtures thereof. If sodium carbonate is used, the purified phosphite solution can then be treated with phosphorus acid to convert any unreacted sodium carbonate to carbon dioxide and additional sodium phosphite. The phosphite solution is then passed through a cationic ion exchange resin in the hydrogen form to produce a solution of phosphorus acid having substantially reduced levels of magnesium, iron and aluminum. Preferably, the phosphorus acid solution can be further treated with hydrogen sulfide to precipitate arsenic sulfide, and subsequently concentrated in suitable evaporation equipment to produce a high strength (70 weight %) phosphorus acid product.

DETAILED DESCRIPTION OF THE INVENTION

It has now been found that a highly purified form of phosphorus acid can be produced by removing metallic contaminants, such as iron, aluminum, and magnesium from the calcium hypophosphite-containing waste materials, i.e. hypo mud, prior to converting the hypophosphite to phosphorus acid. As used in the present specification and claims, the expression "highly purified" when used in a qualitative sense to describe phosphorus acid, denotes a commercial grade product i.e. one typically having less than about 30 ppm of each of the above-identified metallic contaminants.

A representative sample of hypo mud which is removed from a sodium hypophosphite reactor during the sodium hypophosphite manufacturing process comprises the following ingredients in the following quantities:

| | |
|---|---|
| Total Water | 43.74 weight % |
| $CaHPO_3$ | 44.99 weight % |
| $Ca(OH)_2$ | 1.79 weight % |
| $CaCO_3$ | 0.80 weight % |
| $Al_2O_3$ | 1.78 weight % |
| $SiO_2$ | 3.51 weight % |
| Fe | 0.08 weight % |
| $SO_4^=$ | 0.005 weight % |
| Unknown | 3.31 weight % |

Although specific quantities of ingredients have been provided in this representative sample, actual amounts of these ingredients can vary greatly depending on the process conditions and feed materials used in the reaction.

As shown above, the two largest components of the hypo mud are water and $CaHPO_3$. However, the hypo mud additionally contains substantial amounts of various impurities. For instance, the iron content of the crude hypo mud is approximately 800 parts per million, while the content of aluminum and silicon oxides on a relative basis can be at least an order of magnitude greater.

As described in more detail in commonly assigned copending application Ser. No. 217,631, filed Dec. 18, 1980, the hypo mud can be mixed with an aqueous solution of phosphorus acid, heated, and filtered to remove many of the undissolvable impurities, such as the oxides of silicon and aluminum. The resulting filtrate can then be passed directly through a column containing an ion exchange resin of the cationic type in the hydrogen form to produce a relatively dilute solution of phosphorus acid. However, it has been found that this procedure, while effective in converting the hypo mud to phosphorus acid, fails to remove significant quantities of dissolvable metallic impurities even after repeated recycling of the phosphorus acid solution through the ion exchange resin column, possibly due to the ability of phosphorus acid to sequester certain impurities. For example, following this general procedure, attempts to reduce the iron level in the solution have only achieved a 60% reduction. This is substantially less than required in a commercial grade product where, based on the hypo mud composition described above, a reduction in the iron content of at least an order of magnitude would be necessary. Thus, the use of a post-conversion, ion exchange treatment has not been found to be effective in producing a highly purified phosphorus acid product.

The present invention achieves this objective by removing the preponderance of the metallic impurities contained in the hypo mud prior to conversion of the calcium phosphite to phosphorus acid. Specifically, this is accomplished by reacting a slurry of the calcium phosphite-containing material with a salt or hydroxide of sodium or potassium to precipitate a calcium salt or hydroxide and form a purified solution of sodium or potassium phosphite depending on the reactant used. The sodium or potassium salts which are useful in the present invention are those salts which are water soluble under the operating conditions of the reaction and produce a calcium precipitate which is relatively insoluble in water under the same operating conditions. Specific examples of inorganic salts which satisfy these criteria include sodium carbonate, sodium bicarbonate, potsssium carbonate, and potassium bicarbonate. Suitable organic salts include those formed from dicarboxylic acids and the higher chain length monocarboxylic acids, i.e. those having chain lengths of 10 or more. Representative organic salts include sodium or potassium laurate, stearate and oxalate. These salts can be utilized in combination with each other or with the corresponding hydroxides, i.e. sodium hydroxide and potassium hydroxide. The reaction forms a relatively insoluble calcium salt or hydroxide and a purified solution of sodium or potassium phosphite depending on the reactant used. The purified phosphite obtained following this procedure contains substantially reduced levels of metallic impurities, such as iron, aluminum, and magnesium. In this form, the phosphite can then be converted directly to phosphorus acid, using a suitable cationic ion exchange resin, to produce a highly purified phosphorus acid product.

The calcium precipitate produced following the reaction with the calcium phosphite-containing material is recovered by filtration of the sodium or potassium phosphite solution, and can then be washed with water to recover usable reaction products for recycle. Following washing, the precipitate can then be discarded.

After separation by filtration, the purified sodium or potassium phosphite solution is converted to phosphorus acid using a cationic ion exchange resin in the hydrogen form. The resin functions chemically by exchanging the hydrogen ions of the resin for the cation of the phosphite, i.e. Na+ or K+. Suitable ion exchange resins for purposes of this invention include the Amberlite series of resins, such as Amberlight 200, Amberlite 120, and Amberlite 120+, which are manufactured and sold under these trademarks by the Rohm & Haas Chemical Company. In general terms, these resins are styrene/divinyl benzene copolymers with sulfonic acid functionality. Those resins which are particularly suitable for this invention are the strongly acidic, gel-type or mactprecticular forms.

The dilute phosphorus acid solution which is produced by the ion exchange process is obtained in a highly purified form and, upon concentration, is suitable for commercial and industrial applications. The concentration step can be accomplished using well known techniques such as evaporation in suitable evaporation equipment. Typically, this equipment should be designed to produce an approximately 70 weight percent phosphorus acid product from an approximately 20 weight percent starting material. Prior to concentration, it is also possible to remove arsenic ions from the phosphorus acid solution by, for example, passing a stream of hydrogen sulfide through the solution to precipitate arsenic sulfide.

The invention will now be further illustrated by reference to the preferred embodiment depicted in the drawing. Although sodium carbonate is the reactant of choice in this invention, chiefly due to its low cost and the relatively low solubility of calcium carbonate, in water, it will be readily understood that the other reactants described herein can be substituted, in whole or in part, for the sodium carbonate depicted in the drawing. The modifications required in the instant process which are necessitated by such a substitution, if not specifically set forth herein, are nevertheless apparent to those skilled in this art.

In the drawing, a slurry of calcium phosphite-containing material is introduced to reactor 15, which can be either a batch or continuous reactor, through line 11 and reacted with a solution of sodium carbonate which is introduced to the reactor through line 13. This reaction may be illustrated as follows:

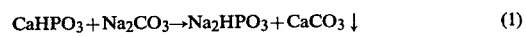

$$CaHPO_3 + Na_2CO_3 \rightarrow Na_2HPO_3 + CaCO_3 \downarrow \qquad (1)$$

Preferably, reaction (1) requires a reaction time of from about 2 hours to about 8 hours at a temperature of from about 40° C. to about 100° C. and a pH of at least about 7. Optimally, the reaction time is about 4 hours, the reaction temperature is about 80° C., and the pH is about 14. Although it is preferred to employ stoichiometric quantities of reactants, this is usually not possible in practice. Consequently, an excess of sodium carbonate over the theoretical stoichiometric amount is commonly used, preferably up to 5% excess, and ideally about 2% excess.

The reaction products of reactor 15 are introduced to filter 19 through line 17 where the calcium carbonate precipitate is separated from the sodium phosphite solution. The calcium carbonate which is removed from the solution is fed to washer 23 through line 21, washed with water 25 to produce a calcium carbonate product containing substantial amounts of iron, aluminum, and magnesium for disposal through line 27, and a recycle stream containing sodium phosphite for recycle to batch reactor 15 through line 29. The purified sodium phosphite solution which is separated from the calcium carbonate precipitate 31 is introduced to reactor 35 and treated with phosphorus acid 33 to convert any unreacted sodium carbonate remaining in the solution to additional sodium phosphite, carbon dioxide and water according to the following reaction:

$$H_3PO_3 + Na_2CO_3 \rightarrow Na_2HPO_3 + CO_2 \uparrow + H_2O \quad (2)$$

The carbon dioxide produced in reactor 35 is withdrawn through line 37 and the reaction solution is then introduced to ion exchange column 41 through line 39 to convert the sodium phosphite to phosphorus acid following the reaction shown below:

$$Na_2HPO_3 + 2R\text{-}H^+ \rightarrow H_3PO_3 + 2R\text{-}Na^+ (R=Resin) \quad (3)$$

If sodium hydroxide is substituted for sodium carbonate as the precipitant in reactor 15, any unreacted sodium hydroxide remaining in solution can also be treated with phosphorus acid to produce additional sodium phosphite and water according to the following reaction:

$$2NaOH + H_3PO_3 \rightarrow Na_2HPO_3 + 2H_2O \quad (4)$$

Alternatively, in this particular embodiment, i.e. when sodium hydroxide is used, converter 35 can be eliminated entirely, and any unreacted hydroxide can be converted to water in ion exchange column 41 as shown below:

$$NaOH + R\text{-}H^+ \rightarrow H_2O + R\text{-}Na^+ (R=Resin) \quad (5)$$

The converted phosphorus acid solution is then introduced to reactor 45 through line 43 where it is treated with hydrogen sulfide which is also introduced to the reactor through line 47 to form an insoluble arsenic sulfide precipitate which is removed by filtration through line 49. Although the removal of arsenic ions from the phosphite solution is depicted as occurring after the ion exchange step but prior to evaporation, such removal can be conveniently accomplished at any earlier stage in the process subsequent to filtration of the solution in filter 19.

Either sodium sulfide or sodium bisulfide, or both, can also be used in place of, or in combination with, hydrogen sulfide to precipitate arsenic sulfide. However, if either sodium sulfide or sodium bisulfide is used, it is preferred to remove the arsenic ions prior to the ion exchange step.

The dilute (20 weight %) highly purified phosphorus acid solution is then introduced to evaporator 53 through line 51 where it is concentrated, suitably to a concentration of about 70 weight percent. Surprisingly, it has been found that although substantial amounts of silica remain in the solution prior to the concentration step, the silica, while soluble in 20 weight % $H_3PO_3$ is essentially insoluble in 70 weight % $H_3PO_3$. Accordingly the silica can be conveniently removed from the solution after evaporation by filtration using conventional filtration means (not shown). The highly purified, concentrated phosphorus acid solution can then be stored 57 prior to shipment 59.

The following examples are intended to further illustrate the various embodiments and advantageous of the present invention without limiting it thereby.

EXAMPLE 1

To 20 weight % phosphorus acid (from reagent grade phosphorus acid (98%)) is added sufficient $FeSO_4$ and $Fe_2(SO_4)_3$ to produce a solution containing 499 ppm of iron as a simulated contaminant. This solution was passed through a column containing an Amberlite 120+ (trademark of the Rohm & Haas Chemical Company) cationic ion exchange resin in the hydrogen form. After one pass through the column, the phosphorus acid was analyzed and found to contain 292 ppm of iron. The phosphorus acid was then passed through the column a second and third time. After the third pass through the column, the phosphorus acid was again analyzed and found to contain 272 ppm of iron, for a net reduction of approximately 60%.

EXAMPLE 2

A four liter batch reactor equipped with an agitator and heating mantle was charged with a slurry of calcium phosphite consisting of 1367 gms of calcium phospite (wet basis) and 1368 gms of water. The actual weight of $CaHPO_3$ in this slurry was 582.1 grams. This slurry was heated to 80° C. and then 564 grams of sodium carbonate was added to the reactor. These reactants were held for a period of 8 hours at 80° C. The reactor was then discharged and the insoluble calcium carbonate was removed from the liquor by filtration. The weight of the filtrate was 1731 grams and it contained 387 grams of sodium phosphite. The calcium carbonate removed from the liquor had a weight of 1568 grams (wet basis) and was washed with 3042 grams of water to recover the sodium phosphite retained in it. A total of 195 grams of sodium phosphite was recovered by washing this filter cake, for a conversion of calcium phosphite to sodium phosphite of 95.3%. The calcium phosphite utilized in the reactor was analyzed and found to contain 228 ppm Fe, 227 ppm Al and 609 ppm of Mg. The sodium phosphite solution produced in the reactor contained less than 1 ppm Fe, 6 ppm Al and less than 1 ppm Mg. The calcium carbonate contained 235 ppm Fe, 156 ppm Al and 625 ppm of Mg.

A solution weighing 1731 grams and containing 386.96 grams of sodium phosphite ($Na_2HPO_2$) was then treated with a solution of phosphorus acid ($H_3PO_3$) containing 189.2 grams of $H_3PO_3$ to convert any unreacted sodium carbonate in the phosphite solution to sodium phosphite and carbon dioxide.

This solution was then passed through a column (2.63″ dia. ×36 inches long) containing an Amberlite 120 (trademark of the Rohm & Haas Chemical Company) cation ion exchange resin (3150 grams) in the hydrogen form. A total of 1847 grams of solution was passed through the ion exchange column. A concentrated stream of 16.8 weight % acid ($H_3PO_3$) weighing 1120 grams was produced. Also a dilute stream weighing 2713 grams and containing 166.1 grams of $H_3PO_3$ was produced. The dilute stream includes the acid displaced from the ion exchange column prior to regenerating the bed. A total of 387 grams of sodium phosphite was passed through the bed which produced 241 grams of $H_3PO_3$, for a 95.75 conversion of sodium phosphite to phosphorus acid.

On a comparative basis, Example 2 illustrates the relative merits of the process of the present invention wherein metallic impurities are removed from the calcium phosphite prior to conversion to phosphorus acid. As shown in this example, the level of metallic impurities is greatly reduced, i.e. by approximately two orders of magnitude. For instance, the amount of iron present in solution is reduced from 228 ppm to less than 1 ppm. In contrast, as shown in Example 1 which illustrates the comparative effectiveness of an ion exchange resin for removing iron as an impurity after conversion to phosphorus acid, a reduction of only about 60% in the quantity of this contaminant is achieved even after three successive passes through the ion exchange resin. These examples thus demonstrate the surprising and unexpected effectiveness of the purification process of the present invention.

While various embodiments and exemplifications of this invention have been shown and described in the specification, modifications and variations thereof will be readily appreciated by those skilled in the art. It is to be understood, therefore, that the appended claims are intended to cover all such modifications and variations which are considered within the scope and spirit of the present invention.

What is claimed is:

1. A process which is capable of producing highly purified phosphorus acid from a slurry of calcium phosphite-containing industrial waste material, said process comprising:
   (a) reacting said slurry with at least one salt or hydroxide of sodium or potassium to form a purified solution comprising a phosphite of sodium or potassium and a calcium precipitate,
   (b) separating said precipitate from the purified phosphite solution, and
   (c) passing the purified phosphite solution from step (b) through a cationic ion exchange resin to produce a solution of highly purified phosphorus acid.

2. The process of claim 1 wherein at least one organic salt of sodium or potassium is used in step (a).

3. The process of claim 2 wherein said organic salt is selected from the group consisting of laurates, stearates and oxalates of sodium or potassium.

4. The process of claim 1 wherein at least one inorganic salt or hydroxide of sodium or potassium is used in step (a).

5. The process of claim 4 wherein said inorganic salt or hydroxide is selected from the group consisting of sodium or potsssium carbonate, bicarbonate, hydroxide, and mixtures thereof.

6. The process of claim 5 wherein the slurry in step (a) is reacted with sodium carbonate to form sodium phosphite and calcium carbonate.

7. The process of claim 6 wherein the reaction in step (a) is conducted at a temperature of from about 40° C. to about 100° C. and a pH of from about 7 to about 14.

8. The process of claim 6 wherein up to about 5% excess sodium carbonate is used based on the stoichiometric amount required in the reaction.

9. The process of claim 6 wherein the precipitate from step (b) is filtered and washed to recover additional sodium phosphite values.

10. The process of claim 9 wherein the sodium phosphite recovered in step (b) is introduced to the reaction in step (a).

11. The process of claim 6 wherein the purified phosphite solution of step (b) is treated with phosphorus acid to convert unreacted sodium carbonate to carbon dioxide and additional sodium phosphite.

12. The process of claim 6 wherein after filtration of the phosphite precipitate of step (a) the purified phosphite solution is treated with a sulfide selected from the group consisting of hydrogen sulfide, sodium sulfide and sodium bisulfide to precipitate arsenic sulfide.

13. The process of claim 12 wherein the sulfide is hydrogen sulfide.

14. The process of claim 13 wherein the arsenic is precipitated after step (c) but prior to concentration of the phosphorus acid.

15. The process of claim 14 wherein the purified phosphorus acid solution is concentrated after step (c) to precipitate silica.

16. The process of claim 15 wherein the solution is filtered to remove precipitated silica.

17. The process of claim 5 wherein the cationic ion exchange resin is a copolymer of styrene/divinyl benzene having sulfonic acid functionality.

18. The process of claim 17 wherein the cationic ion exchange resin is of the strongly acidic form.

19. The process of claim 5 wherein the slurry in step (a) is reacted with sodium hydroxide to form sodium phosphite and calcium hydroxide.

20. The process of claim 19 wherein the purified phosphite solution of step (b) is treated with phosphorus acid to convert unreacted sodium hydroxide to water and additional sodium phosphite.

21. The process of claim 19 wherein the purified solution from step (b) is passed directly through the cationic ion exchange resin without phosphorus acid treatment.

* * * * *